US012177279B2

(12) United States Patent
Field et al.

(10) Patent No.: US 12,177,279 B2
(45) Date of Patent: *Dec. 24, 2024

(54) SYSTEMS AND METHODS FOR CONTENT TRANSMISSION

(71) Applicant: Comcast Cable Communications, LLC, Philadelphia, PA (US)

(72) Inventors: Brian Field, Evergreen, CO (US); Jan Van Doorn, Castle Rock, CO (US); Mark Torluemke, Centennial, CO (US); Jim Hall, Centennial, CO (US); Daniel Groustra, Littleton, CO (US); John Leddy, Bryn Mawr, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/684,114

(22) Filed: Mar. 1, 2022

(65) Prior Publication Data
US 2022/0272139 A1 Aug. 25, 2022

Related U.S. Application Data

(63) Continuation of application No. 16/866,827, filed on May 5, 2020, now Pat. No. 11,303,685, which is a continuation of application No. 13/212,307, filed on Aug. 18, 2011, now Pat. No. 10,681,096.

(51) Int. Cl.
*H04L 65/611* (2022.01)
*H04L 65/70* (2022.01)

(52) U.S. Cl.
CPC ............ *H04L 65/611* (2022.05); *H04L 65/70* (2022.05)

(58) Field of Classification Search
CPC ................................ H04L 65/611; H04L 65/70
See application file for complete search history.

(56) References Cited

U.S. PATENT DOCUMENTS

| | | | |
|---|---|---|---|
| 5,113,392 A | 5/1992 | Takiyasu et al. | |
| 5,440,545 A * | 8/1995 | Buchholz | H04L 1/1614 370/442 |
| 5,821,519 A | 10/1998 | Lee et al. | |
| 6,351,467 B1 | 2/2002 | Dillon | |
| 7,359,983 B1 | 4/2008 | Maufer et al. | |
| 7,539,750 B1 | 5/2009 | Parker et al. | |
| 7,870,278 B2 | 1/2011 | Corl, Jr. et al. | |
| 8,150,993 B2 | 4/2012 | Glasser et al. | |
| 8,244,879 B2 | 8/2012 | Pagan | |
| 8,347,343 B2 | 1/2013 | Suh et al. | |
| 8,661,295 B1 | 2/2014 | Khanna et al. | |
| 2003/0031176 A1 | 2/2003 | Sim | |
| 2003/0162495 A1 | 8/2003 | Yonemoto et al. | |

(Continued)

FOREIGN PATENT DOCUMENTS

WO WO-0142941 A1 * 6/2001 ......... H04B 7/18523

*Primary Examiner* — Philip C Lee
(74) *Attorney, Agent, or Firm* — Banner & Witcoff, Ltd.

(57) ABSTRACT

Aspects of the disclosure relate to transmitting content throughout a distribution network. For example, a computing device may generate data packets and attribute packets, and transmit the data packets and attribute packets to one or more user devices. The attribute packets may comprise information that enables validation and storage after the data packet is reassembled by the receiving device.

36 Claims, 10 Drawing Sheets

(56) References Cited

U.S. PATENT DOCUMENTS

| | | |
|---|---|---|
| 2003/0187917 A1 | 10/2003 | Cohen |
| 2003/0188009 A1* | 10/2003 | Agarwalla ............ H04L 67/564 |
| | | 709/236 |
| 2004/0052371 A1 | 3/2004 | Watanabe |
| 2004/0098408 A1 | 5/2004 | Gensel |
| 2006/0029102 A1 | 2/2006 | Abe et al. |
| 2006/0031411 A1 | 2/2006 | Gimson et al. |
| 2007/0027974 A1 | 2/2007 | Lee et al. |
| 2008/0170531 A1 | 7/2008 | Petry et al. |
| 2009/0138911 A1 | 5/2009 | Flemming et al. |
| 2009/0158096 A1 | 6/2009 | Ali et al. |
| 2009/0169177 A1 | 7/2009 | Ui |
| 2009/0216537 A1 | 8/2009 | Nishiyama et al. |
| 2010/0067518 A1 | 3/2010 | Kaufman et al. |
| 2010/0180171 A1 | 7/2010 | Liu et al. |
| 2010/0260191 A1 | 10/2010 | Hiie et al. |
| 2010/0296584 A1* | 11/2010 | Base ..................... G06F 16/40 |
| | | 375/E7.026 |
| 2011/0158247 A1 | 6/2011 | Toyoshima |
| 2011/0261822 A1 | 10/2011 | Battestilli et al. |
| 2011/0302320 A1* | 12/2011 | Dunstan ................ H04L 12/185 |
| | | 370/252 |
| 2012/0047119 A1* | 2/2012 | Kandekar ............. G06F 16/748 |
| | | 707/705 |

\* cited by examiner

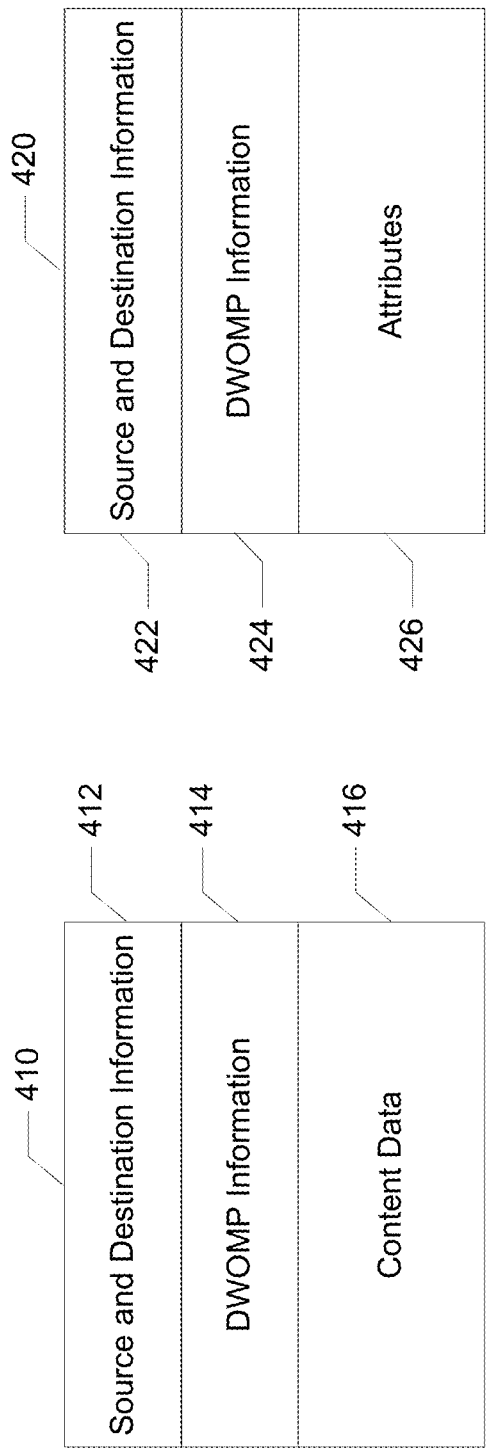

SYSTEMS AND METHODS FOR CONTENT TRANSMISSION

CROSS-REFERENCE TO RELATED APPLICATIONS

This application is a continuation of U.S. patent application Ser. No. 16/866,827, filed May 5, 2020, which is a continuation of U.S. patent application Ser. No. 13/212,307, filed Aug. 18, 2011, now U.S. Pat. No. 10,681,096, which is hereby incorporated by reference in its entirety.

BACKGROUND

Devices, such as network gateways, set top boxes, and web-enabled devices, may be deployed in numerous premises throughout information distribution networks that serve numerous premises, such as households and/or businesses, over a wide region. Content providers distribute content, services, and other information to the premises via the information distribution networks. How efficiently the content provider is able to deliver the content, services, and other information to the devices throughout the network depends on various factors. For example, the capacity (e.g., bandwidth) of the network, the number of the devices being serviced by the content provider, and the schemes and/or protocols used throughout the network can affect the network's performance. The network could perform more efficiently and handle more data if an increased amount of bandwidth can be used for delivering the desired content, or if the amount of available bandwidth could be used more effectively to deliver the desired content to devices of the network.

SUMMARY

Some aspects of the disclosure relate to methods and systems for delivering content to devices of a distribution network via a multicast transmission. In one or more arrangements, a multicast transmission may deliver content to a plurality of devices. For example, a computing device of a content provider may generate a plurality of packets that includes one or more portions of a content fragment, which includes content data. The computing device may also generate one or more attributes related to the content fragment. The plurality of packets may conform to a protocol configured to enable reassembly of the content fragment at a plurality of receiving devices. In some embodiments, the protocol may also be configured to enable storage of the content fragment based on at least one of the one or more attributes. The computing device may also transmit the plurality of packets from the computing device of the content provider in accordance with the protocol.

In one or more arrangements, the plurality of packets may include different types of packets, such as one or more content packets and one or more attribute packets. Additionally, in some embodiments, the protocol may be the discrete web object multicast protocol (DWOMP).

Other aspects of the disclosure may relate to a method and system for joining devices, such as a content server, to a multicast group; receiving content for the multicast group; and transmitting the received content via a multicast transmission. For example, a content server may join a multicast group via a multicast group server, receive content for the multicast group from a linear feed and transmit the received content via a multicast transmission. A content server may transmit fragments of the content via a multicast to one or more devices that have joined the multicast group.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which:

FIG. 4B illustrates an example content packet.

FIG. 4C illustrates an example attribute packet.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
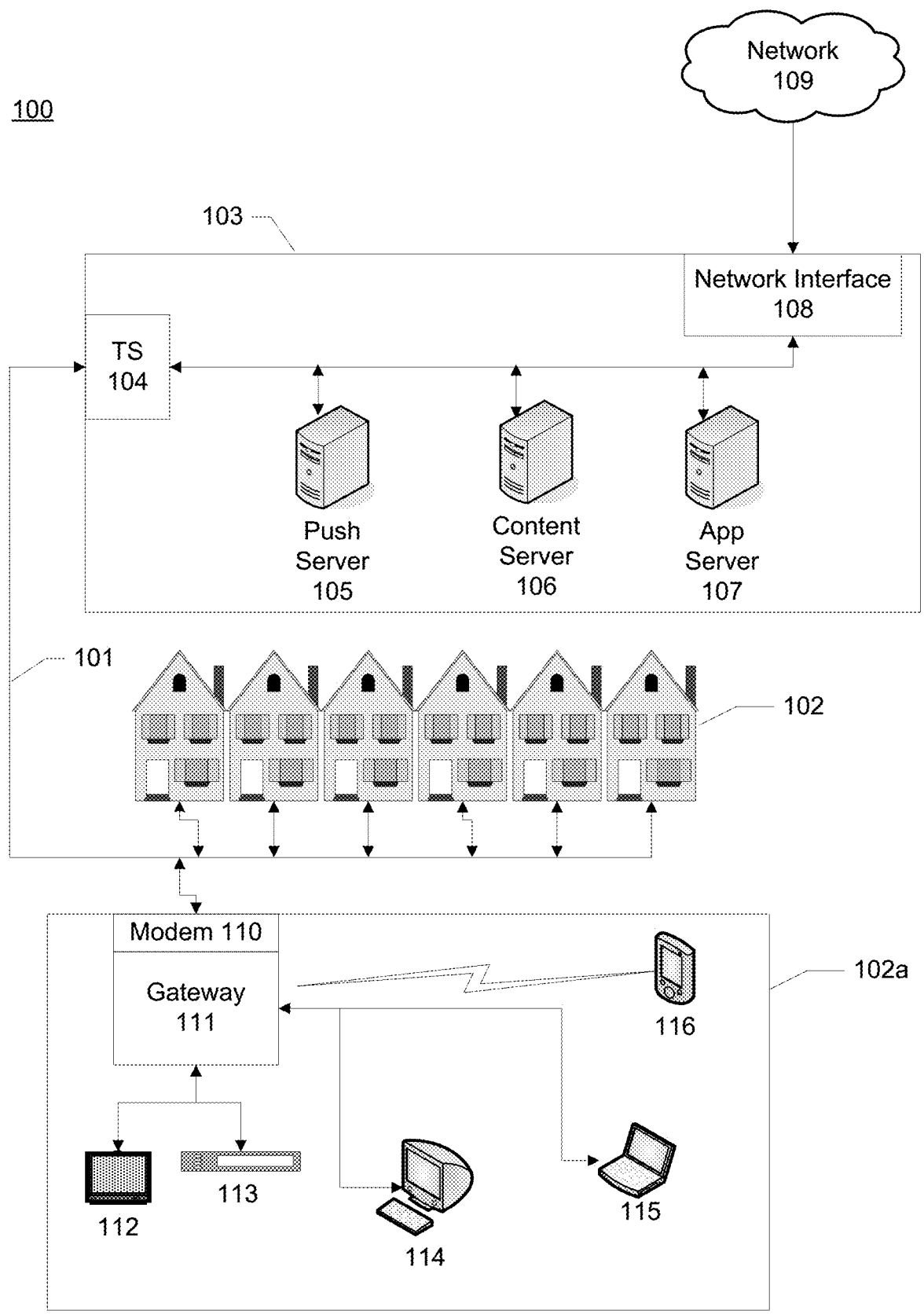
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Such networks 100 may use a series of interconnected communication lines 101 (e.g., coaxial cables, optical fibers, wireless, etc.) to connect an end-point to a central office or headend 103. Example end-points are illustrated in FIG. 1 as premises 102 (e.g., businesses, homes, consumer dwellings, etc.) The central office 103 may transmit information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in a HFC network, which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content and/or data server 106. The content/data server 106 may be one or more computing devices that are configured to provide content to users at their premises. This content may be, for example, video on demand movies, television programs, songs, text listings, etc., and/or data such as contact information, address books, and other user information. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The modem 110 may be connected to, or be a part of, a gateway interface device 111. The gateway interface device 111 may be a computing device that communicates with the modem 110 to allow one or more other devices in the premises to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the premises, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
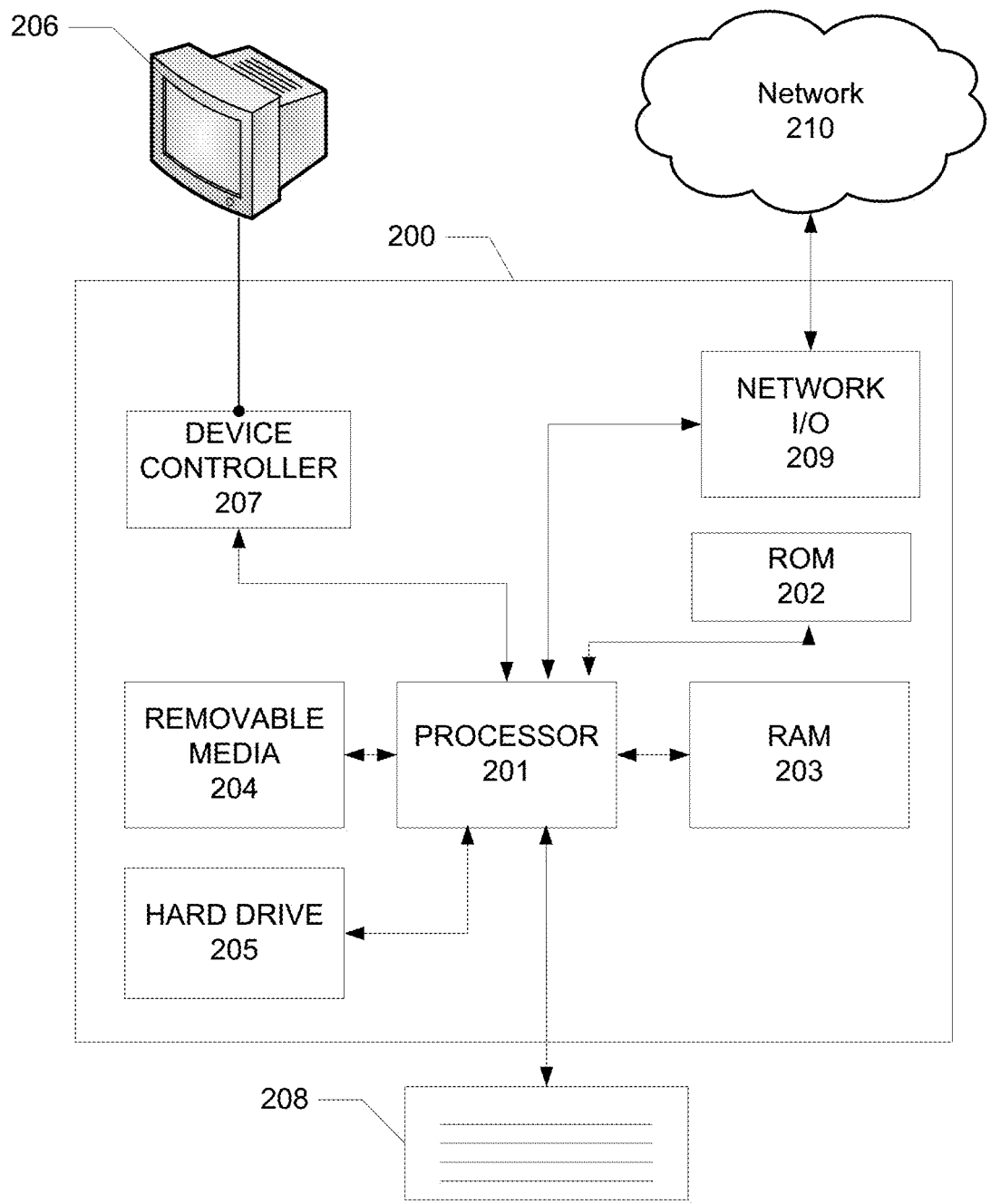
FIG. 2 illustrates an example hardware platform on which various elements described herein can be implemented.

FIG. 2 illustrates an example hardware platform on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of the networks illustrated in FIGS. 1A and 1B, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of an information distribution network may transmit information downstream to various devices, such as receiving devices (e.g., a gateway interface device 111 of FIG. 1, web proxy, web server, etc.), or other user equipment (e.g., televisions 112, STBs 113, personal computers 114, laptop computers 115, wireless devices 116 of FIG. 1). The transmitted information may include content for consumption by a user (e.g., playback, viewing, listening, display, storage, etc.). To assist in distributing content to the various devices of the distribution network, a content provider may implement a system, scheme and/or protocol that multicasts content to the devices. In one or more arrangements, a multicast may be receivable by a plurality of devices. For example, devices in a plurality of premises (e.g., premises 102 of FIG. 1) at or near a first geographic location may be able to receive a multicast. Additionally, in some embodiments, other devices in a plurality of other premises, which are at or near a different geographic location, may not be able to receive a multicast. Devices that can receive the multicast can extract content and/or other information from the multicast transmission to receive content. The received content can then be subsequently displayed for consumption by a user. These aspects of the disclosure and others will be described in detail below.

Figure 3:
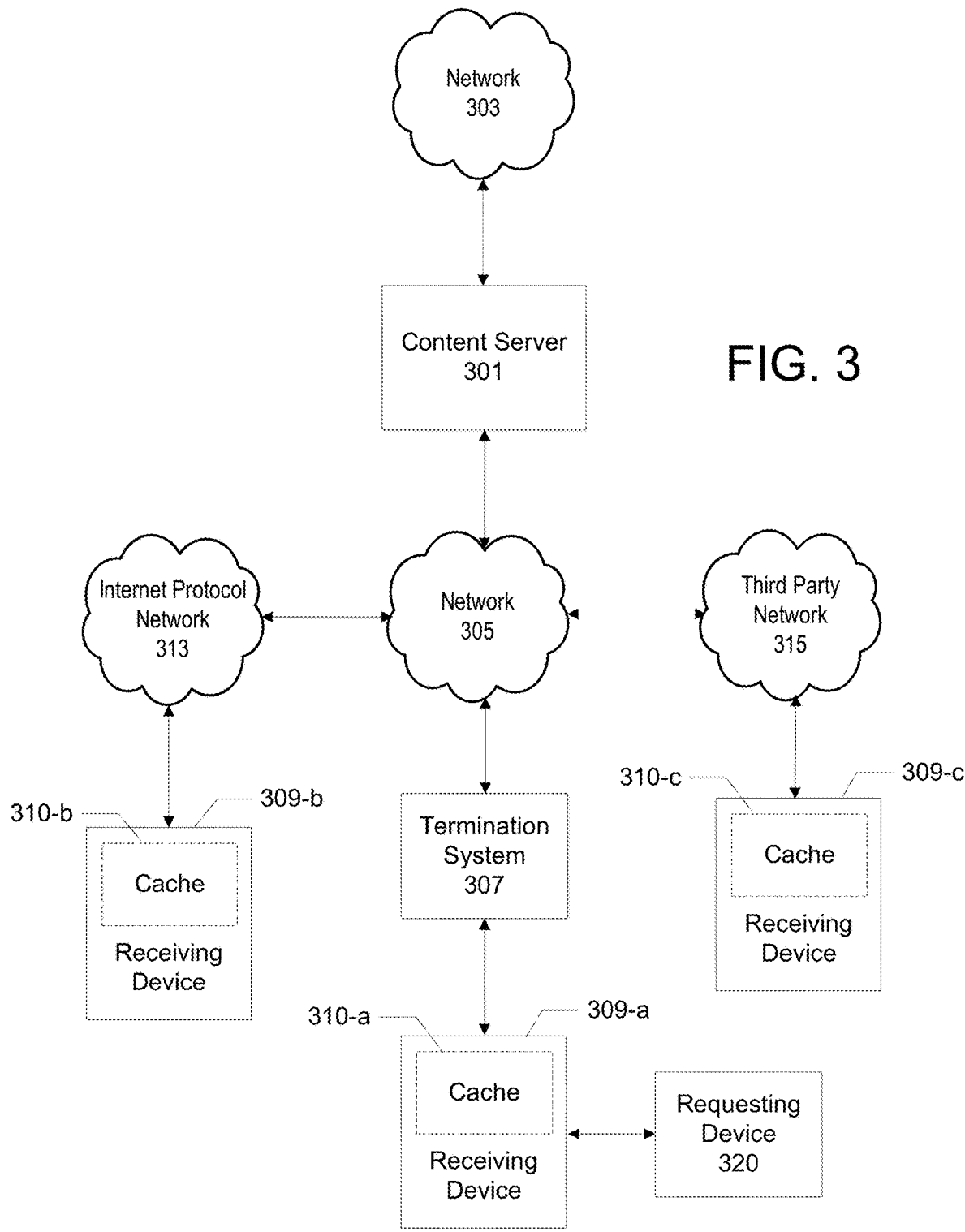
FIG. 3 illustrates an example system for multicasting content to devices of an information distribution or access network according to one or more aspects of the disclosure.

FIG. 3 illustrates an example system for multicasting content to devices of an information distribution or access network. As illustrated in FIG. 3, a system for multicasting content may include a content server 301 (e.g., content/data server 106 of FIG. 1), and a network 303. The network 303 may include various network components and/or devices, such as servers, routers, communication lines, etc. For example, network 303 may include one or more content sources and/or service sources of the content provider (e.g., television program source, video-on-demand source, pay-per-view source, an interactive service source, data source, etc.). These sources (not shown) may transmit content items to the content server 301 for distribution to other devices, such as receiving devices 309-a, 309-b, and 309-c. In one or more arrangements, the content sources may be sending content to the content server 301 via one or more linear feeds (e.g., an MPEG-2 linear feed, such as MPEG2-TS information encapsulated in one or more datagrams conforming to the uniform datagram protocol (UDP)).

In some embodiments, content server 301 may be configured to receive one or more linear feeds from one or more content sources, extract content (e.g., data) from the linear feeds, convert the data, if needed, and transmit a multicast feed to one or more receiving devices (e.g., via a multicast feed). For example, to convert data into a multicast, content server 301 may receive a plurality of content fragments (e.g., a portion of a larger content item, such as a video file). Content server 301 may then process and/or divide the plurality of content fragments into one or more packets conforming to a protocol for a multicast transmission. In one arrangement, content server 301 may be configured to convert content data into a multicast transmission conforming to the discrete web object multicast protocol (DWOMP), or other suitable protocols. Details of these, and others, will be discussed below.

In one or more arrangements, content server 301 may distribute content to receiving devices that are connected to the content server 301 via a plurality of different networks. As illustrated in FIG. 3, receiving device 309-a is connected to the content server via a termination system 307 (e.g., TS 104 of FIG. 1) and network 305 of the content provider. Receiving device 309-b is connected to content server 301 via network 305 of the content provider and an Internet Protocol (IP) network 313 (e.g., the Internet). Receiving device 309-c is connected to content server 301 via network 305 of the content provider and a third party network 315 (e.g., a distribution network of another content provider, or a local network). Network 305 of the content provider may include one or more devices for interfacing with IP network 313 and/or third-party distribution network 315, such as a web proxy and/or web server (e.g., a web server at the edge of network 305 that interfaces with a device on IP network 313 and manages communications to and from IP network 313), and the like. Network 305 may itself be an IP network and other arrangements for connecting with devices 309 may be implemented.

In one or more arrangements, a receiving device (e.g., receiving device 309-a, 309-b and 309-c) may be configured to receive multicast content (e.g., receive a multicast feed), decode and/or process the multicast content, store the multicast content in a cache, and provide the multicast content for consumption (e.g., for display via another device). In some embodiments, the receiving devices may include one or more caches for storing data, such as the data received via a multicast. As illustrated in FIG. 3, receiving device 309-a includes cache 310-a, receiving device 309-b includes cache 310-b, and receiving device 309-c includes cache 310-c. Additionally, in some arrangements, content server 301 may be configured to transmit data to receiving devices using both unicasts and multicasts.

Some or all receiving devices (e.g., receiving device 309-a, 309-b and 309-c) may be able to communicate with one or more requesting devices, or other user device (e.g., devices 112, 113, 114, 115 and 116 of FIG. 1). A requesting device may be configured to transmit requests for content to a receiving device, such as when particular content is required for viewing or other consumption. For example, as illustrated in FIG. 3, requesting device 320, may transmit an HTTP get request identifying particular content (e.g., a content fragment) to the receiving device 309-a. Receiving device 309-a may determine whether the particular content is in cache 310-*a*. If the content is found within cache 310-*a*, it may be retrieved from cache 310-*a* and transmitted to requesting device 320. Upon receiving the requested content, requesting device 320 may display the content, store the content for later viewing, etc. Requesting device 320 may take various forms, such as set-top box, a laptop or personal computer, a television set, etc. Also, the receiving and requesting devices may comprise one device.

A multicast transmission may conform to a particular protocol. Some protocols suitable for multicasting may be configured to cause content data to be stored at a plurality of receiving devices based on at least one r of the content data. One protocol suitable for multicasting content is the discrete web object multicast protocol (DWOMP). While the following discussion may refer to DWOMP in connection with example embodiments, it is to be understood that other protocols for communicating web objects are applicable. With reference specifically to DWOMP, the discrete web object multicast protocol is suitable for multicasting data objects, such as content fragments. Transmissions conforming to DWOMP may encapsulate data objects into one or more packets. DWOMP can encapsulate various types of object data, such as content items (e.g., a video file), service data objects (e.g., electronic service guide data), and the like. For example, in some arrangements, electronic program guide (EPG) data could be multicast using content packets that include the electronic program guide data and/or attribute packets that include attributes of the EPG multicast transmission. Indeed, any type of object data could be multicast according to the disclosure (e.g., content data, service data, object data, Internet data, web data, software update data, advertisement data, etc.).

In one or more arrangements, DWOMP may be configured to enable devices receiving a multicast transmission conforming to DWOMP to reassemble the data objects (e.g., a content fragment) at the receiving devices. For example, a transmission conforming to DWOMP may include content packets and attribute packets. The contents of the attribute packets and/or content packets enable receiving devices to reassemble a content fragment that is divided between the content packets. Additionally, in some arrangements, DWOMP may be configured to enable devices receiving a multicast transmission conforming to DWOMP to store the data objects (e.g., a content fragment) at the receiving devices based on one or more attributes included in the multicast transmission. Further, DWOMP allows for each data object to be self-describing in that the content and attribute packets for a particular data object may provide the name for the reassembled data object so a receiving device can store and/or retrieve the reassembled data object when needed. Details of these features, and others, will be discussed in detail below.

Figure 4A:
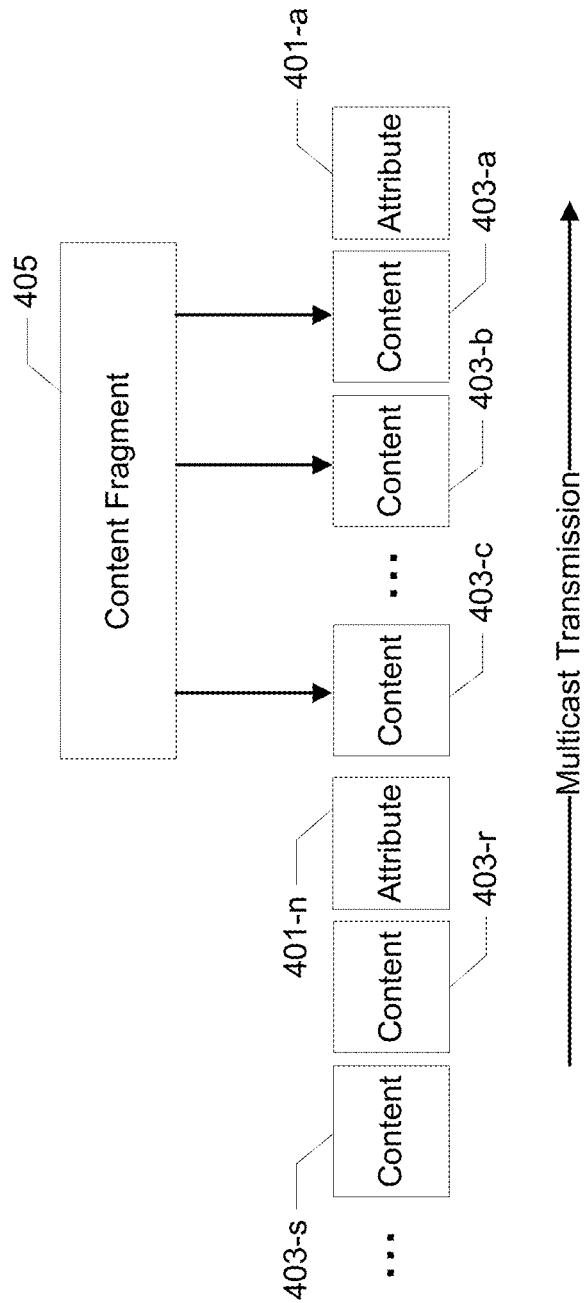
FIG. 4A illustrates a diagram representing an example multicast transmission according to one or more aspects of the disclosure.

FIG. 4A illustrates a diagram representing an example multicast transmission (e.g., multicast feed). As illustrated in FIG. 4A, an attribute packet for the multicast transmission is followed by one or more content packets (e.g., attribute packet 401-*a* is followed by content packet 403-*a*, 403-*b*, 403-*c*, etc., attribute packet 401-*n* is followed by content packet 403-*r*, 403-*s*, etc.). In some arrangements, the example multicast transmission may conform to DWOMP.

For example, the multicast transmission of FIG. 4A may be for a particular content item (e.g., video file, video for a linear feed) and the content item may be divided into fragments or objects. In some arrangements, each content fragment or object may include enough content data to reproduce a portion (e.g., a second, two seconds) of the entire content item (e.g., video file, video for a linear feed). Further, in one or more embodiments, each content fragment or object may include content for a particular portion of the content item (e.g., an advertisement image/animation, a widget for display, content for a table cell, etc.) Additionally, each content fragment may include header information that allows a device to store, decode and/or demultiplex the content data of the fragment for consumption (e.g., view the two seconds of video included in the fragment on a display device).

The size of a content fragment may vary. For example, some fragments may be on the order of kilobytes, while others may be a megabyte or more. The header information of a content fragment may include a fragment identifier, which uniquely identifies the content fragment. In one example, content fragment 405 may include 101355 bytes of content data and have a fragment identifier of "/service/lr-ae/fragment-43" where "fragment-43" identifies the $43^{rd}$ content fragment.

Content fragment 405 may be de-assembled and inserted into one or more content packets. For example, because a content fragment may be on the order of kilobytes or larger, the content fragment may be portioned (or otherwise de-assembled) and the portions inserted into different content packets. As illustrated in FIG. 4A, content fragment 405 is portioned between a first plurality of content packets that includes content packets 403-*a*, 403-*b*, and 403-*c*. The number of content packets in a plurality of content packets may be determined, for example, based on the size of the content fragment. In some arrangements, a content packet may be 1500 bytes long, with a maximum payload of 1450 bytes. Using this size of a content packet as an example, content fragment 405, which may include 101355 bytes of content data, may be portioned over 70 content packets. Additional details on the data of a content packet will be discussed below.

Each plurality of content packets may be associated with one or more attribute packets. As illustrated in FIG. 4A, the first plurality of content packets that includes content packets 403-*a*, 403-*b* and 403-*c* is associated with attribute packet 401-*a*. Attribute packet 401-*a* includes information related to the first plurality of content packets (e.g., content packet 403-*a*, 403-*b*, 403-*c*, etc.) and/or content fragment 405. Additional details on the data of an attribute packet will be discussed below.

Other content fragments may be processed and/or divided into other content packets. For example, as illustrated in FIG. 4A, a different content fragment (e.g., content fragment "/service/lr-ae/fragment-42", etc.) may be divided between a second plurality of content packets that includes content packets 403-*r* and 403-*s*. The second plurality of content packets is associated with attribute packet 401-*n*, which may include attributes related to the second plurality of content packets and/or the different content fragment.

In some embodiments, because each content fragment has its own set of content and attribute packets, each content fragment in a multicast transmission may be independent from other fragments in the multicast transmission (e.g., each content fragment is self-describing). In other words, each fragment can be separately reassembled and stored by a receiving device based on its own attributes. Indeed, the reassembly and storage of the content fragment at a receiving device may not be dependent on any of the other content fragments included in the multicast transmission. As illustrated in FIG. 4A, content fragment 405 could be reassembled and stored at a receiving device once attribute packet 401-*a* and all its content packets (e.g., packets 403-*a*, 403-*b*, 403-*c*, etc.) have been received.

FIG. 4B illustrates an example content packet. As illustrated in FIG. 4B, content packet 410 includes source and destination information 412, DWOMP (or other protocol) information 414 and content data 416.

In some arrangements, source and destination information 412 may include data fields related to various web-based protocols, such as source and destination addresses and/or ports. In one example, source and destination information 412 may include IP destination address information (e.g., 232.x.y.z), IP source address information (e.g., 69.240.a.b), and UDP destination port information (e.g., 9000).

In one or more illustrative embodiments, DWOMP information 414 may include data fields related to the multicast transmission, such as a packet number, a payload size, and bytes remaining data fields. In some arrangements, DWOMP information 414 may include a packet number that is relative to particular content packets (e.g., the first plurality of content packets of FIG. 4A that includes content packets 403-a, 403-b, and 403-c). For example, a first content packet for a content fragment (e.g., content packet 403-a of FIG. 4A) may have a packet number of x, while the last content packet for the content fragment (e.g., content packet 403-c of FIG. 4A) may have a packet number of x+n, where n is the number of content packets. Various other packet numbering schemes are possible. For example, the packets may be numbered relative to particular content packets and an associated attribute packet (e.g., if the attribute packet for a content fragment has a packet number of x, the first content packet for the content fragment can be x+1, and the last content packet can be x+1+n, where n is the total number of content packets, etc.) As another example, the packet numbering scheme may be an incremental scheme that is applied to all packets in the multicast transmission (e.g., attribute packet 401-a of FIG. 4A is packet 0, content packet 403-a is packet number 1, content packet 403-c is the 100$^{th}$ packet in the multicast transmission and has a packet number of 99, attribute packet 401-n is packet number 100, etc.)

The value of the payload size may represent the length in bytes of the content data 416 portion of the content packet. In some illustrative embodiments, a content packet has a maximum amount of content data that can be held (e.g., 1450 bytes, etc.). In some instances, all but one content packet for a content fragment would contain the maximum amount of content data. For example, the first content packet for a content fragment may have a payload size equal to the maximum amount (e.g., content packet 403-a of FIG. 4A may have a payload size of 1450 bytes), while the last content packet for the content fragment may have a payload size equal to the remainder of the content fragment (e.g., content packet 403-c of FIG. 4A may have a payload size of 1305 bytes).

The value of the bytes remaining data field may represent the number of bytes remaining in the content fragment. This value may be calculated based on the end of the content fragment. For example, the first content packet for a content fragment (e.g., content packet 403-a of FIG. 4A) can have Y-m (e.g., 99815) bytes remaining, where Y is the total number of bytes in the content fragment (e.g., 101355) and m is the payload size of the first content packet (e.g., 1450 bytes). The second content packet can have Y-m-k (e.g., 98365) bytes remaining, where k is the payload size of the second content packet (e.g., 1450 bytes). Extending this formula throughout the remaining content packets, the last content packet (e.g., content packet 403-c of FIG. 4A) can have zero bytes remaining.

FIG. 4C illustrates an example attribute packet. As illustrated in FIG. 4C, attribute packet 420 includes source and destination information 422, DWOMP (or other protocol) information 424 and attributes 426. In some arrangements, source and destination information 422 may include data fields similar to the source and destination information of a content packet (e.g., source and destination information 412 of FIG. 4B), such as source and destination addresses (e.g., IP source address, IP destination address, etc.) and/or ports (e.g., UDP destination port). However, in one or more arrangements, the values of an attribute packet's source and destination information may be different when compared to the source and destination information for the content packet. For example, content packets and attribute packets may be directed to different destination ports (e.g., content packets 403-a, 403-b, and 403-c of FIG. 4A may be directed to a UDP destination port of 9000, while attribute packet 401-a may be directed to a UDP destination port of 9050).

In one or more illustrative embodiments, DWOMP information 414 may include data fields similar to the DWOMP information of a content packet (e.g., DWOMP information 414 of FIG. 4B), such as a packet number, a payload size and a bytes remaining data field. Additionally, in some embodiments, the payload size of attribute packet 420 may depend on the size of the attribute packet's attributes portion 426. In some arrangements, the bytes remaining data field included in DWOMP information for attributes packets may have a zero value.

An attribute packet's attributes portion 426 may include one or more data fields that identify attributes and/or characteristics of content packets and/or a content fragment. For example, referring to FIG. 4A, attribute packet 401-a may include an attributes portion that includes one or more data fields identifying attributes and/or characteristics related to the first plurality of content packets, which includes content packets 403-a, 403-b and 403-c. The attributes portion of attribute packet 401-a may also include attributes and/or characteristics related to content fragment 405. Referring again to FIG. 4C, in some arrangements attributes 426 may include a fragment name identifier, a service identifier, a content destination port data field, a file size data field, caching information, and a checksum field.

In some embodiments, the fragment name identifier may be the same as a fragment identifier. For example, with respect to FIG. 4A, attribute packet 401-a may include a fragment name identifier that is the same as the fragment identifier of content fragment 405 (e.g., "/service/lr-ae/fragment-43").

In some arrangements, a service identifier may identify a service for the content data. In one or more arrangements, the service identifier may be similar to a portion of the fragment identifier. For example, with respect to FIG. 4A, attribute packet 401-a may include a service identifier that identifies a service for content fragment 405 (e.g., "lr-ae").

In some embodiments, a content destination port data field may identify the destination port of the content packets associated with the attribute packet. For example, with respect to FIG. 4A, attribute packet 401-a may include a content destination port data field that identifies the destination port of content packets 403-a, 403-b, 403-c, etc., (e.g., a destination port of 9000).

In one or more embodiments, a file size data field may indicate the size (e.g., in bytes) of the content fragment (e.g., the size of content fragment 405 of FIG. 4A) and/or the entire content item (e.g., content fragment 405 of FIG. 4A is one fragment of a content item, such as a fragment of a video file for a video-on-demand service) of the multicast transmission illustrated in FIG. 4A includes content fragment 405).

In one or more arrangements, caching information may include additional information used by a receiving device (e.g., receiving devices 309-*a*, 309-*b*, 309-*c* of FIG. 3) when caching and/or storing the content data received via the content packets.

In some embodiments, a checksum field can include a checksum for validating the reassembled content fragment at a receiving device. The value of the checksum field could be calculated based on the content fragment of the attribute packet. For example, with respect to content fragment 405 of FIG. 4A, attribute packet 401-*a* may include a checksum field whose value is calculated from content fragment 405. Alternatively, the checksum could be calculated based on the content data of the content packets associated with attribute packet 401-*a* (e.g., content packets 403-*a*, 403-*b*, 403-*c*, etc.). The checksum field can be used by a receiving device to validate reassembled content fragment. The receiving device may, upon receiving the necessary packets and reassembling the content fragment, compute a checksum from the re-assembled content fragment and compare the computed checksum to the checksum included in the attribute packet. If the two values match, the re-assembled content fragment could be stored and/or made available for consumption (e.g., viewing). If the values are different, the reassembled content fragment could be discarded and/or an appropriate error condition could be flagged.

Figure 5:
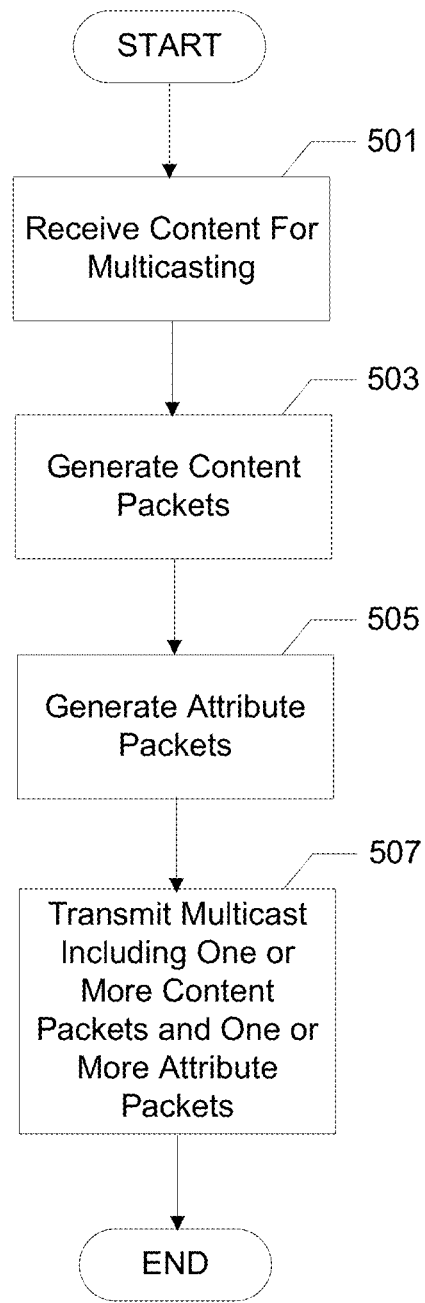
FIG. 5 illustrates an example method for multicasting content according to one or more aspects of the disclosure.

FIG. 5 illustrates an example method for multicasting content. In some arrangements, a content server (e.g., content server 301 of FIG. 3) may be configured to perform the example method of FIG. 5 so that content can be transmitted via a multicast transmission (e.g., a multicast transmission as illustrated by FIG. 4A).

Referring to FIG. 5, at step 501, the content server may receive content for multicasting. As discussed above, a content server may receive content from different content sources (e.g., television program source, video-on-demand source, pay-per-view source, an interactive service source, etc.). In one example, the content server may receive one or more content fragments (e.g., content fragment 405 of FIG. 4A), such as fragments of a video file for a video-on-demand service via a linear feed from a video-on-demand source. In another example, the content server may receive content fragments from a linear feed of a live television program (e.g., a live sporting event, such as a football game). Each received content fragment has a size (e.g., in bytes), and may include a unique fragment identifier (e.g., "/service/lr-ae/fragment-43", etc.). In some instances, the content server may receive content fragments for a particular content item (e.g., a video file for a video-on-demand service, etc.). In some embodiments, in order to receive the content fragments, the content server may determine which linear feed includes the content fragment(s), extract the content fragment(s) from the linear feed, and/or store the content fragment(s) in a local memory of the content server (e.g., store a Portable Network Graphics (PNG) or similar version of the content fragment in a cache of the content server).

At step 503, the content server may generate one or more content packets. In some arrangements, the content server may retrieve one or more content fragments from the local memory (e.g., content fragment 405 of FIG. 4A). For each retrieved content fragment, the content server may encapsulate a content fragment into content packets (e.g., encapsulate content fragment 405 of FIG. 4A into the first plurality of content packets, which includes content packets 403-*a*, 403-*b* and 403-*c*). For example, content packets may be generated for each content fragment that was received at step 501 (e.g., generate content packets 403-*a*, 403-*b*, 403-*c*, etc., of FIG. 4A for content fragment 405, etc.). In one or more arrangements, the content packets may conform to DWOMP (e.g., example content packet illustrated by FIG. 4B), and include DWOMP information and/or source and destination information.

At step 505, the content server may generate one or more attribute packets. For example, an attribute packet may be generated for each content fragment that was received at step 501 (e.g., generate attribute packet 401-*a* of FIG. 4A for content fragment 405, etc.). In some arrangements, the content server may determine one or more attributes based on a content fragment and/or content packets. In some instances, the determined attributes can include attributes such as a fragment name identifier, a service identifier, a content destination port data field, a file size data field, and caching information, etc. Once determined, the attributes may be encapsulated within one or more attribute packets (e.g., encapsulate attributes into attribute packet 401-*a* of FIG. 4A). In some arrangements, the attribute packets may conform to DWOMP (e.g., the example attribute packet illustrated by FIG. 4C), and include DWOMP information and/or source and destination information.

At step 507, the content server may proceed with transmitting the multicast. The multicast transmission may include the content packets and attribute packets generated in steps 503 and 505. In some arrangements, the content server may first transmit one or more attribute packets (e.g., attribute packet 401-*a* of FIG. 4) and then transmit one or more content packets following the attribute packet(s) (e.g., transmit the first plurality of content packets of FIG. 4A, which includes content packets 403-*a*, 403-*b* and 403-*c*, after transmitting attribute packet 401-*a*). In others, the content server may first transmit one or more content packets (e.g., content packet 403-*a*, 403-*b* and 403-*c*, etc.) and then transmit one or more attribute packets following the content packet(s) (e.g., transmit attribute packet 401-*a* after content packet 403-*a*, 403-*b* and 403-*c*, etc.). Additionally and/or alternatively, the order in which the content packets and/or attribute packets for a content fragment are transmitted may be specified by DWOMP, or another protocol. The process of transmitting attribute packets and content packets may be repeated until each received content fragment has been transmitted via the multicast transmission.

In some embodiments, the content server may perform and/or initiate the multicast transmission in response to various conditions. In one or more arrangements, the content server may use a combination of the following examples.

For example, the multicast may be performed based on an event time, such as a date or time-of-day, etc. In some instances, the multicast may be performed before a broadcast, consumption and/or distribution time for the content (e.g., in order for the content data of the program to be placed in a cache of a receiving device before it is processed for consumption, such as viewing). In one example, a multicast for a television program may be initiated/performed before the scheduled broadcast time of the television program (e.g., a multicast for a television program that will be broadcast at 8:00 PM may be initiated/performed before 8:00 PM). A consumption time may be a time that is in relation to when the content is to be consumed by a receiving device, such as an indication of when a receiving device needs the content (e.g., a time when a receiving device is to begin recording/viewing the content, a time when a receiving device is scheduled to begin recording/viewing the content, etc.). For example, a multicast being initiated/performed prior to a consumption time may be transmitted such that the content is received by the receiving devices prior to the receiving device needing the content and/or content fragments (e.g., prior to the scheduled consumption time). A distribution time may be a time that is in relation to when the content is to be distributed from a provider or a computing device of a provider (e.g., a time of release for the content). For example, a multicast being initiated/performed prior to a distribution time may be transmitted such that the content is received by the receiving devices prior to a time that the content becomes available to users of the content provider's services (e.g., prior to a movie or television program becoming available in a video-on-demand service, etc.).

As another example, the multicast may be performed based on the receipt of content data at the content server (e.g., the content server is configured to multicast the content whenever the server receives content data from a content source).

In another example, the multicast may be performed based on type of content. As a few illustrative examples, content (e.g., a movie) for a video-on-demand may be multicast, while content for one or more television programs being currently broadcast (e.g., a sitcom on a broadcast television channel) may not; content for a pay-per-view event (e.g., a boxing match) may be multicast, while video-on-demand content may not; sports event content (e.g., a live football game, a rebroadcast of a basketball game, etc.) may be multicast, while other television programs may not; news-related content (e.g., a local news program) may be multicast, while other content may not, etc.

As yet another example, the multicast may be performed if the content is being consumed (e.g., viewed) by a threshold number of users (or is expected to be consumed/watched by a threshold number of users). As one example, only content for certain sporting events (e.g., a playoff game, championship game, etc.) may be multicast, while other sports events may not. Similarly, live sporting events (or premieres of television programs) could be multicast, while rebroadcasts may not.

Figure 6:
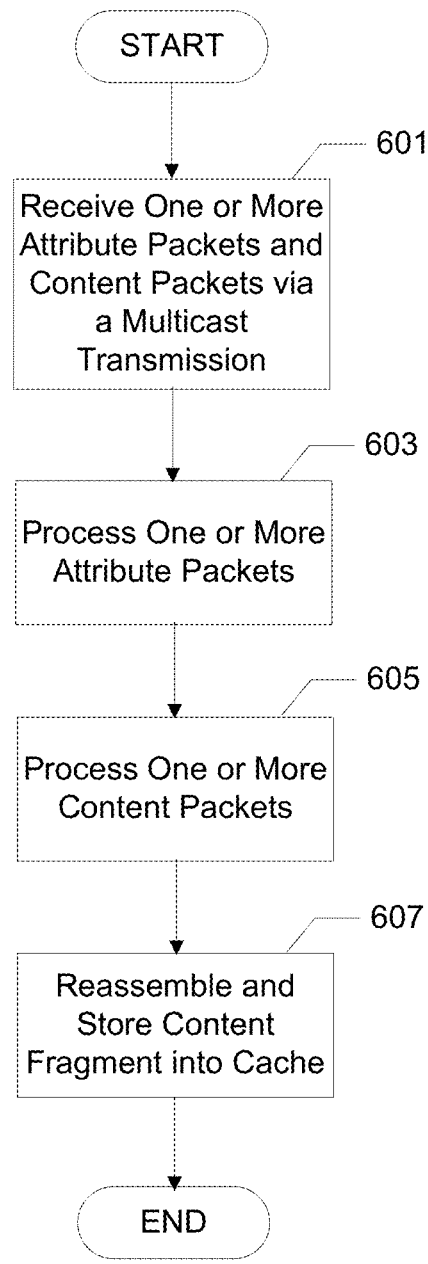
FIG. 6 illustrates an example method for receiving a multicast transmission according to one or more aspects of the disclosure.

FIG. 6 illustrates an example method for receiving a multicast transmission (e.g., at a receiving device, such as receiving device 309-*a* of FIG. 3). In one or more arrangements, the manner in which a receiving device receives the multicast transmission may be specified by DWOMP, or another protocol. At step 601, the receiving device may receive one or more attribute packets and one or more content packets via a multicast transmission (e.g., attribute packets 401-*a*, 401-*n* of FIG. 4A, content packets 403-*a*, 403-*b*, 403-*c*, 403-*r*, 403-*s*, etc.). In some arrangements, attribute packets may be received via a first port (e.g., at the port identified by the destination port of the attribute packet's source and destination information). Similarly, content packets may be received via a second port (e.g., at the port identified by the destination port of the source and destination information of the content packet).

At step 603, the receiving device may process one or more attribute packets. In some arrangements, the processing of the attribute packets conforms to the DWOMP specification. For example, the receiving device may extract information from the DWOMP information and attributes portions of an attribute packet. In one or more arrangements, processing an attribute packet may include extracting the one or more attributes, such as the fragment name identifier, the content packets destination port, the file size, and any caching information, and storing the extracted attributes in a memory of the receiving device, (e.g., cache 310-*a* of receiving device 309-*a* of FIG. 3). The processing may also include extracting the packet number, payload size, and/or bytes remaining data fields from the attribute packet.

At step 605, the receiving device may process one or more content packets. In some arrangements, the processing of the content packets may conform to the DWOMP specification. For example, the receiving device may extract information from the DWOMP information and content data portions of a content packet. In one or more arrangements, processing the content packets may include extracting content data (e.g., portions of a content fragment) from the payload of the content packets and storing the extracted content data into a memory. The processing may also include extracting the packet number, payload size, and/or bytes remaining data fields from the content packet.

Additionally, in some arrangements, step 605 may be performed before step 603. For example, the receiving device may process one or more content packets and then process one or more attribute packets.

At step 607, the receiving device may reassemble and store a content fragment into a cache or other memory (e.g., cache 310-*a* of receiving device 309-*a* of FIG. 3). For example, in some embodiments, content packets can contain portions of content data for a particular content fragment (e.g., content fragment 405 of FIG. 4A). Additionally, the content packets may be associated with one or more attribute packets (e.g., attribute packet 401-*a* of FIG. 4A is associated with the first plurality of content packets, which includes content packets 403-*a*, 403-*b* and 403-*c*). Using the information decoded from the content packets and any associated attribute packet, the receiving device may reassemble the content fragment (e.g., reassemble content fragment 405 using information extracted from attribute packet 401-*a* and the first plurality of content packets, which includes content packets 403-*a*, 403-*b*, and 403-*c*). In one example, the DWOMP information extracted from the content and attribute packets in steps 603 and 605 are used, in conjunction with the attributes extracted in step 605, to reassemble the content fragment.

Upon reassembling the content fragment, the receiving device may store the content fragment into a cache of the receiving device, or other memory. In some arrangements, the content fragment may be stored in the cache based on information of an attribute packet (e.g., content fragment 405 of FIG. 4A, upon being reassembled at a receiving device, may be stored based on information included in attribute packet 401-*a*). For example, the content fragment could be stored according to a fragment name identifier of the attribute packet (e.g., content fragment 405 of FIG. 4A is stored and given the name of "/service/lr-ae/fragment-43"). As another example, the content fragment could be stored according to the caching information of the attribute packet. As yet another example, the content fragment could be stored based on a combination of the fragment name identifier and the caching information. In some arrangements, how the content fragment is stored determines how the content fragment is accessed after it has been stored. For example, if the content fragment is stored according to the fragment name identifier, the fragment name identifier may be used to access the content fragment after it has been stored (e.g., content fragment 405 of FIG. 4A is accessed using an identifier of "/service/lr-ae/fragment-43").

Figure 7:
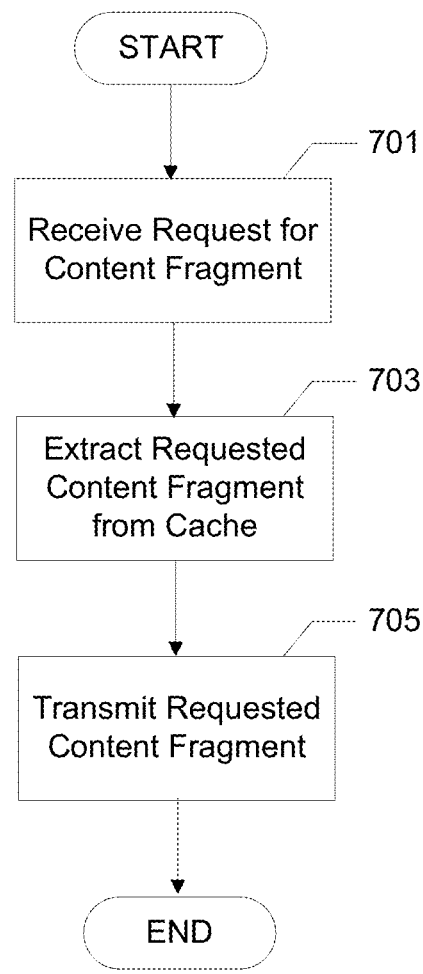
FIG. 7 illustrates an example method for retrieving content from a cache according to one or more aspects of the disclosure.

FIG. 7 illustrates an example method for retrieving content from a cache (e.g., from a cache of a receiving device, such as cache 310-*a* of FIG. 3). In one or more arrangements, the cache may be used to store the content fragment until the content is to be consumed by a user device (e.g., displayed on a television, computer, etc.). For example, another device (e.g., a set-top box, computer, other user device, etc., as illustrated by requesting device 320 of FIG. 3) may transmit requests (e.g., HTTP get requests) for content data when the device is ready to process the data for consumption (e.g., viewing).

As illustrated in FIG. 7, at step 701, the receiving device receives a request for a content fragment (e.g., an HTTP get request from requesting device 320 of FIG. 3). At step 703, the receiving device (e.g., receiving device 309-a of FIG. 3) extracts the requested content fragment from its cache. For example, the receiving device may determine whether the fragment is in the receiving device's cache (e.g., cache 310-a of FIG. 3) and if the content fragment is in the cache, the fragment is retrieved. In one or more arrangements, the content fragment may be retrieved from the cache according to a fragment name identifier, various caching information, or some combination thereof. At step 705, the receiving device may transmit the requested content fragment to the source of the request (e.g., requesting device 320 of FIG. 3).

In some arrangements, a content server (e.g., content server 301 of FIG. 3) may transmit a multicast to receiving devices (e.g., receiving devices 309-a, 309-b, 309-c of FIG. 3) using a multicast group. In some embodiments, a multicast group may be dedicated a particular type of data, such as data for a video-on-demand channel, data for one or more channels, etc. In other embodiments, a multicast group may be shared with other types of data. For example, a shared multicast group may include data for one or more multicast transmissions, and/or other data, such as linear content data, non-linear content data, and other non-multicast data. As one illustrative example, a multicast group may be established that first sends a content fragment for a first service (e.g., a fragment of a movie shown on HBO®), then sends a different content fragment for a second service (e.g., a fragment of a sporting event on ESPN®). Once the attribute packet(s) and content packets for the fragment of the movie have been received by a receiving device, it may be reassembled and stored (e.g., the fragment for the movie is self-describing). Similarly, once the attribute packet(s) and content packets for the fragment of sporting event have been received by a receiving device, it may be reassembled and stored (e.g., the fragment for the sporting event is self-describing).

Figure 8:
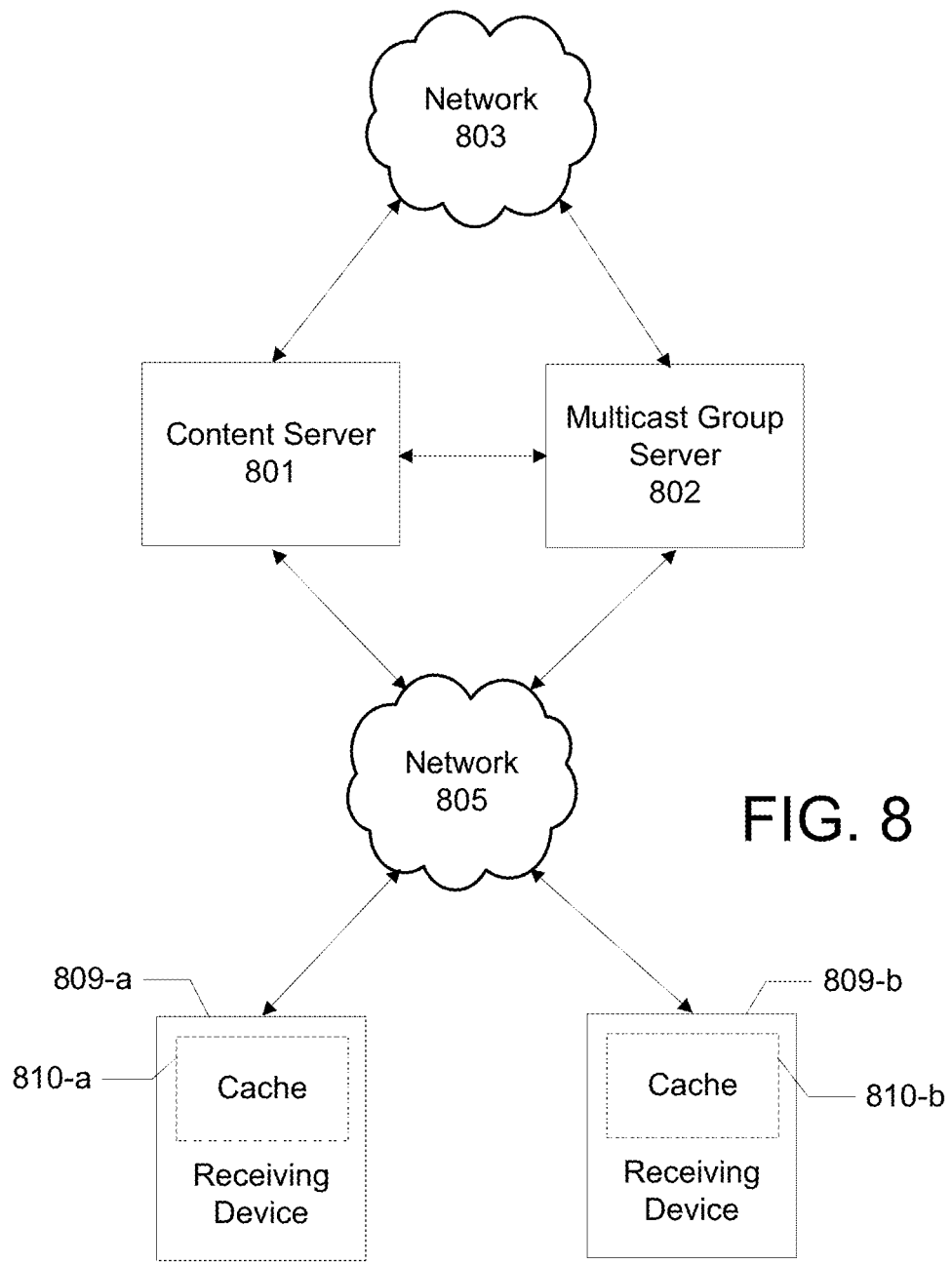
FIG. 8 illustrates an example system for multicasting content using a multicast group according to one or more aspects of the disclosure.

FIG. 8 illustrates an example system for multicasting content using a multicast group. As illustrated in FIG. 8, a system for multicasting content to a multicast group may include one or more content servers, such as content server 801 (e.g., content/data server 106 of FIG. 1, content server 301 of FIG. 3). The multicast system may also include network 803 (e.g., network 303 of FIG. 3), network 805 (e.g., network 305 of FIG. 3), and one or more receiving devices (e.g., receiving device 809-a and receiving device 809-b, etc.). Network 803 may include one or more content sources and/or service sources of the content provider (e.g., the content and/or service sources described above with respect to FIG. 3). In some arrangements, the receiving devices of FIG. 8 may be configured similar to the receiving devices discussed above (e.g., receiving devices 309-a, 309-b, 309-c of FIG. 3). Receiving devices 809-a and 809-b may include their own cache (e.g., cache 810-a and cache 810-b).

As also illustrated in FIG. 8, the system for multicasting content to a multicast group may include a multicast group server 802. Content server 801 and/or receiving devices 809-a and 809-b may be configured to communicate with the multicast group server 802. For example, multicast group server 802 may be configured to manage multicast groups by, for example, informing devices of which multicast groups to join/leave, processing join requests (e.g., multicast group join requests), joining devices to one or more multicast groups, storing information related to the multicast groups and the joined devices (e.g., the members of the multicast groups), and/or transmitting information related to the multicast groups and/or the joined devices.

Figure 9:
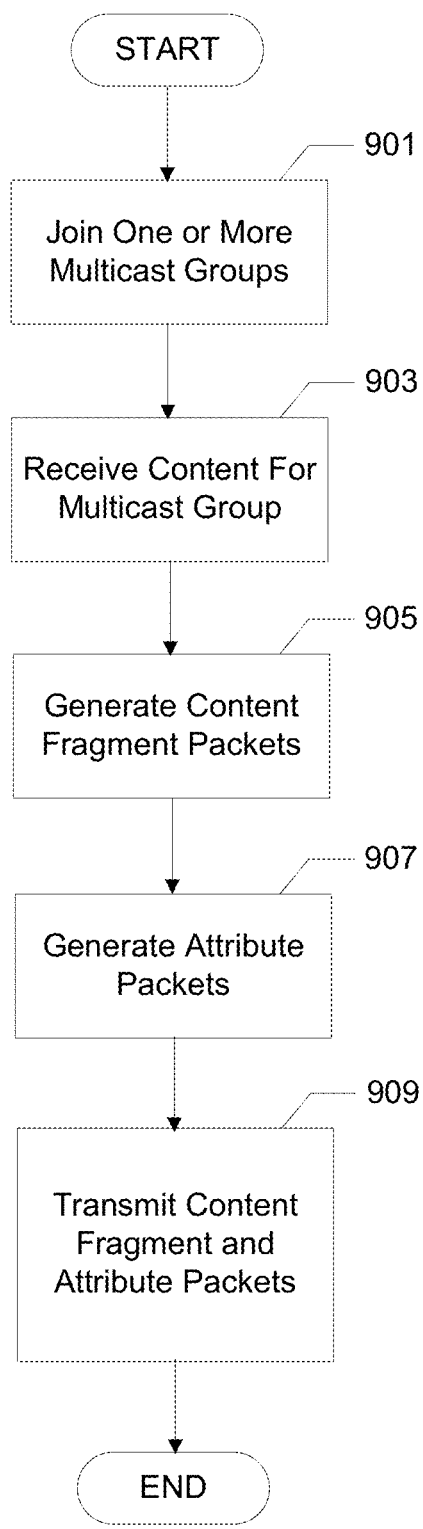
FIG. 9 illustrates an example method for multicasting content using a multicast group according to one or more aspects of the disclosure.

FIG. 9 illustrates an example method for multicasting content using a multicast group. In some embodiments, a content server may be configured to perform the example method of FIG. 9. At step 901, the content server (e.g., content server 801) may join (if not already a part of) one or more multicast groups. In some arrangements, the multicast group server may transmit information to the content server that identifies which multicast groups the content server is to join. The transmitted information may include information allowing the content server to join the identified groups and/or begin extracting data for the multicast group from one or more linear feeds. Additionally, in some arrangements, joining a multicast group may include transmitting a multicast group join request to a multicast group server (e.g., multicast group server 802). In response to the multicast join request, the multicast group server may process the request and/or join the content server to one or more multicast groups. Upon processing and/or joining the content server, the multicast group server may respond to the content server with information related to the joined multicast group(s). In some embodiments, operators of the content provider may configure the multicast group server to join a content server to particular multicast groups.

Upon joining one or more multicast groups and/or receiving information related to the joined multicast groups, the content server may proceed with receiving content for the one or more multicast groups (e.g., extract data for the multicast group from one or more linear feeds). For example, a content server (e.g., content server 801 of FIG. 8) may use the information received from the multicast group server to select one or more linear feeds, and receive content from the selected linear feeds (e.g., content for multicasting, such as a television program, video-on-demand content, pay-per-view content, an interactive service content, etc.).

At step 905, upon receiving the content for the multicast group, the content server may generate content packets for the received content and, at step 907, generate attribute packets for the received content. The content packets and/or attribute packets may be generated in a manner that is the same or similar to the methods described above (e.g., steps 503 and 505 of FIG. 5, etc.). For example, the attribute packets and/or the content packets may conform to the DWOMP protocol, or other suitable protocol.

Additionally, in one or more embodiments, step 907 may be performed prior to step 905. For example, the content server, upon receiving the content for the multicast group, may generate attribute packets for the received content and then generate content packets for the received content.

At step 909, the content server may transmit the content packets and attribute packets via a multicast transmission. In some arrangements, transmitting the content packets and attribute packets may be performed in a manner that is the same or similar to the methods described above (e.g., step 507 of FIG. 5, FIG. 4, etc.).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
   receiving, by a computing device and responsive to a request for content, a plurality of data packets associated with object data, wherein each of the plurality of data packets comprises a respective portion of the object data, and wherein the object data is configured to be reassembled by the computing device based on one or more attribute packets;
   receiving, by the computing device and responsive to the request for content, the one or more attribute packets, wherein the one or more attribute packets comprises:
      information for reassembling the object data and information for validating the reassembled object data; and
      an identifier, of the object data, configured to identify the reassembled object data after storage by the computing device;
   reassembling, based on the plurality of data packets and the one or more attribute packets, the object data; and
   storing, in a cache and based on the identifier of the object data and based on the validation of the reassembled object data, the reassembled object data.

2. The method of claim 1, further comprising:
   receiving a request for the object data;
   retrieving, from the cache and based on the identifier of the object data, the object data; and
   outputting, based on the request for the object data, the object data.

3. The method of claim 1, wherein the one or more attribute packets comprises a checksum for validating the reassembled object data, and
   wherein the one or more attribute packets further comprises one or more of: caching information usable by the computing device for storing the reassembled object data; a service identifier, an indication of a destination port for the plurality of data packets, or an indication of a size of the object data.

4. The method of claim 1, wherein the receiving the plurality of data packets is performed via a first destination port;
   wherein the receiving the one or more attribute packets is performed via a second destination port different from the first destination port; and
   wherein the one or more attribute packets comprises an indication of the first destination port.

5. The method of claim 1, wherein the object data comprises content data, service data, Internet data, web data, software update data, or advertisement data.

6. A computing device comprising:
   one or more processors, and
   memory storing instructions that, when executed by the one or more processors, cause the computing device to:
      receive, responsive to a request for content, a plurality of data packets associated with object data, wherein each of the plurality of data packets comprises a respective portion of the object data, and wherein the object data is configured to be reassembled by the computing device based on one or more attribute packets;
      receive, responsive to the request for content, the one or more attribute packets, wherein the one or more attribute packets comprises:
         information for reassembling the object data and information for validating the reassembled object data; and
         an identifier, of the object data, configured to identify the reassembled object data after storage by the computing device;
      reassemble, based on the plurality of data packets and the one or more attribute packets, the object data; and
      store, in a cache and based on the identifier of the object data and based on the validation of the reassembled object data, the reassembled object data.

7. The computing device of claim 6, wherein the instructions, when executed by the one or more processors, further cause the computing device to:
   receive a request for the object data;
   retrieve, from the cache and based on the identifier of the object data, the object data; and
   output, based on the request for the object data, the object data.

8. The computing device of claim 6, wherein the one or more attribute packets comprises a checksum for validating the reassembled object data, and
   wherein the one or more attribute packets further comprises one or more of: caching information usable by the computing device for storing the reassembled object data; a service identifier, an indication of a destination port for the plurality of data packets, or an indication of a size of the object data.

9. The computing device of claim 6, wherein the instructions, when executed by the one or more processors, cause the computing device to receive the plurality of data packets via a first destination port;
   wherein the instructions, when executed by the one or more processors, cause the computing device to receive the one or more attribute packets via a second destination port different from the first destination port; and
   wherein the one or more attribute packets comprises an indication of the first destination port.

10. The computing device of claim 6, wherein the object data comprises content data, service data, Internet data, web data, software update data, or advertisement data.

11. The method of claim 1, wherein the plurality of data packets and the one or more attribute packets conform to discrete web object multicast protocol (DWOMP).

12. The method of claim 1, wherein each of the plurality of data packets comprises a packet number, a payload size, and an indication of a number of bytes remaining for the object data.

13. The method of claim 1, wherein the identifier of the object data comprises an indication of where the object data is located in a content item.

14. The method of claim 1, wherein the computing device comprises a web server or a web proxy.

15. The computing device of claim 6, wherein the plurality of data packets and the one or more attribute packets conform to discrete web object multicast protocol (DWOMP).

16. The computing device of claim 6, wherein each of the plurality of data packets comprises a packet number, a payload size, and an indication of a number of bytes remaining for the object data.

17. The computing device of claim 6, wherein the identifier of the object data comprises an indication of where the object data is located in a content item.

18. The computing device of claim 6, wherein the computing device comprises a web server or a web proxy.

19. A non-transitory computer-readable medium storing instructions that, when executed, cause performance of actions comprising:
receiving, by a computing device and responsive to a request for content, a plurality of data packets associated with object data, wherein each of the plurality of data packets comprises a respective portion of the object data, and wherein the object data is configured to be reassembled by the computing device based on one or more attribute packets;
receiving, responsive to the request for content, the one or more attribute packets, wherein the one or more attribute packets comprises:
information for reassembling the object data and information for validation the reassembled object data; and
an identifier, of the object data, configured to identify the reassembled object data after storage by the computing device;
reassembling, based on the plurality of data packets and the one or more attribute packets, the object data; and
storing, in a cache and based on the identifier of the object data and based on the validation of the reassembled object data, the reassembled object data.

20. The non-transitory computer-readable medium of claim 19, wherein the instructions, when executed, further cause performance of actions comprising:
receiving a request for the object data;
retrieving, from the cache and based on the identifier of the object data, the object data; and
outputting, based on the request for the object data, the object data.

21. The non-transitory computer-readable medium of claim 19, wherein the one or more attribute packets comprises a checksum for validating the reassembled object data, and
wherein the one or more attribute packets further comprises one or more of: caching information usable for storing the reassembled object data,
a service identifier, an indication of a destination port for the plurality of data packets, or an indication of a size of the object data.

22. The non-transitory computer-readable medium of claim 19, wherein the instructions, when executed, cause performance of actions comprising:
receiving the plurality of data packets via a first destination port; and
receiving the one or more attribute packets via a second destination port different from the first destination port; and
wherein the one or more attribute packets comprises an indication of the first destination port.

23. The non-transitory computer-readable medium of claim 19, wherein the object data comprises content data, service data, Internet data, web data, software update data, or advertisement data.

24. The non-transitory computer-readable medium of claim 19, wherein the plurality of data packets and the one or more attribute packets conform to discrete web object multicast protocol (DWOMP).

25. The non-transitory computer-readable medium of claim 19, wherein each of the plurality of data packets comprises a packet number, a payload size, and an indication of a number of bytes remaining for the object data.

26. The non-transitory computer-readable medium of claim 19, wherein the identifier of the object data comprises an indication of where the object data is located in a content item.

27. The non-transitory computer-readable medium of claim 19, wherein the computing device comprises a web server or a web proxy.

28. A system comprising:
a first computing device, and
a second computing device;
wherein the first computing device is configured to:
receive, responsive to a request for content, a plurality of data packets associated with object data, wherein each of the plurality of data packets comprises a respective portion of the object data, and wherein the object data is configured to be reassembled by the first computing device based on one or more attribute packets;
receive, responsive to the request for content, the one or more attribute packets, wherein the one or more attribute packets comprises:
information for reassembling the object data and information for validating the reassembled object data; and
an identifier, of the object data, configured to identify the reassembled object data after storage by the first computing device;
reassemble, based on the plurality of data packets and the one or more attribute packets, the object data; and
store, in a cache and based on the identifier of the object data and based on the validation of the reassembled object data, the reassembled object data; and
wherein the second computing device is configured to send the plurality of data packets.

29. The system of claim 28, wherein the first computing device is further configured to:
receive a request for the object data;
retrieve, from the cache and based on the identifier of the object data, the object data; and
output, based on the request for the object data, the object data.

30. The system of claim 28, wherein the one or more attribute packets comprises a checksum for validating the reassembled object data, and
wherein the one or more attribute packets further comprises one or more of: caching information usable by the first computing device for storing the reassembled object data, a service identifier, an indication of a destination port for the plurality of data packets, or an indication of a size of the object data.

31. The system of claim 28, wherein the first computing device is configured to:
- receive the plurality of data packets via a first destination port; and
- receive the one or more attribute packets via a second destination port different from the first destination port; and
- wherein the one or more attribute packets comprises an indication of the first destination port.

32. The system of claim 28, wherein the object data comprises content data, service data, Internet data, web data, software update data, or advertisement data.

33. The system of claim 28, wherein the plurality of data packets and the one or more attribute packets conform to discrete web object multicast protocol (DWOMP).

34. The system of claim 28, wherein each of the plurality of data packets comprises a packet number, a payload size, and an indication of a number of bytes remaining for the object data.

35. The system of claim 28, wherein the identifier of the object data comprises an indication of where the object data is located in a content item.

36. The system of claim 28, wherein the first computing device comprises a web server or a web proxy.

* * * * *